UNITED STATES PATENT OFFICE.

WOLCOTT C. FOSTER, OF RUTHERFORD, NEW JERSEY, ASSIGNOR TO STATEN ISLAND CHEMICAL CORPORATION, OF NEW YORK, N. Y., A CORPORATION OF NEW YORK.

PROCESS FOR REGENERATING PERMUTITS.

1,249,368. Specification of Letters Patent. Patented Dec. 11, 1917.

No Drawing. Application filed August 19, 1915. Serial No. 46,386.

*To all whom it may concern:*

Be it known that I, WOLCOTT C. FOSTER, a citizen of the United States, residing at Rutherford, in the county of Bergen and State of New Jersey, have invented certain new and useful Improvements in Processes for Regenerating Permutits, of which the following is a full, clear, and exact description.

My invention relates to a certain new and useful process for the regeneration of substances often termed "permutits," natural and artificial zeolites, metallate silicates, silico aluminates, aluminate silicates, alumino silicates, hydrous silicates, and any other similar chemical combinations which are sometimes considered to be colloids or in the colloidal state. These substances have been used to a certain extent in the arts, particularly in water softening and like processes where an exchange of bases or adsorption is necessary to carry out the desired reactions. For convenience I will use the term "permutit" in my specification and claims when referring to substances such as I have indicated.

In describing my process I will refer particularly to sodium "permutit," an artificial zeolite or metallate silicate with a sodium base. It will be understood that "permutits" of different bases or mixtures of different bases may be used as well in which case in my process it is merely necessary to use the corresponding base or bases in the reagents utilized in the regeneration process.

In the process of water softening with which I will illustrate the uses of these substances it has been found that an exchange of bases or adsorption takes place, and that the substances which produce the hardness in the water, such as calcium or magnesium salts exchange bases with the sodium in the "permutit" or are adsorbed by the "permutit" and thereby change the hard water to soft water. After a considerable quantity of water has been treated the property of the "permutit" of exchanging bases or adsorbing the hardness producing constituents from the water diminishes and its regeneration is finally necessary. This regeneration has usually been accomplished by treating the exhausted "permutit" with solutions of certain salts, for example, sodium chlorid, if a sodium base "permutit" was being regenerated. It was first thought that this treatment effected a complete regeneration or back exchange of bases and that the "permutit" so treated regained its former strength. By a somewhat extended commercial use of this process this has been found not to be the case, since, after a number of regenerations, the "permutit" gradually loses its strength and finally becomes useless for removing the hardness producing constituents from the water. This fact detracts from the extensive use of "permutit" in commercial installations, since frequent renewals of the "permutit" were found to be necessary.

In my process I have found that by introducing a new step in the process of regeneration or revivifying, the "permutit" can be kept practically indefinitely in its normal strength. I have also found that "permutit" which has been regenerated by treating with a salt solution and which has eventually lost its strength can be restored to practically its original strength by putting it through the new step in the process. In my process I first treat the exhausted "permutit" with a solution of a salt of the same base or bases as the "permutit;" then the "permutit" is thoroughly washed and afterward I complete the process of regeneration by treating the "permutit" with an aqueous solution of a hydroxid of the corresponding base or bases. With this process I have found that the "permutit" does not lose its base exchanging or adsorption property and retains its strength for a much greater time. In treating exhausted "permutit" which has already been treated with salt solutions for the purpose of regeneration I merely treat the exhausted "permutit" with an aqueous solution of a hydroxid of the same base or bases corresponding to the base or bases of the "permutit" (*i. e.* with a sodium permutit I use sodium hydroxid).

*Example.*

The hard water is first passed through a filter containing sodium "permutit" (or it may be brought into close contact with the "permutit" in any other desired manner) and this treatment is continued until the "permutit" becomes to a certain extent inactive, or no longer exchanges or adsorbs bases to an extent sufficient to reduce the hard water to the required maximum degree of hardness (for example 0°). Then the inactive "permutit" is treated with a 7% solution of sodium chlorid. This treatment is continued until the inactive "permutit" has been regenerated to the extent possible by the use of the sodium chlorid solution. The "permutit" is then thoroughly washed, preferably until the wash water appears to be practically free from chlorids. Then the process of regenerating the "permutit" is completed by treating it with a 1% solution of sodium hydroxid. This treatment is continued until no further sodium is taken up by the "permutit." Finally the "permutit" may be washed if desired to remove any free sodium hydroxid. The importance of this final washing step would depend upon the process for which the effluent from the "permutit" is to be applied. The "permutit" is again ready to exchange bases or adsorb them and remove the hardness producing constituents from the water.

It is to be understood that the strength of the solutions may be varied within wide limits, as I have used sodium chlorid solutions with strengths up to 40% and have used sodium hydroxid solutions with strengths ranging from ¼% to 45%. In the example given above it will be understood that the strength of the solutions are merely for purposes of illustration. They are, however, the strength which I have found most useful in practice.

In this process of regeneration it will be understood that other salts of the same base may be substituted for sodium chlorid. It will also be understood that when "permutit" of a different base than sodium is used the salt having the corresponding base will be used for the first step in the regenerative process and that the hydroxid of the corresponding base will be used in the second step of the process. For example if potassium permutit were used, a solution of potassium chlorid may be used for the first step in the regeneration and a solution of potassium hydroxid would be used in the second step. Other such equivalent substitutions will occur to any chemist skilled in the art.

My experience has shown that a "permutit" may be used having a combination of different bases. The reagent to be used should correspond to one or more of these bases, and my intention is that my claims shall include this invention.

It will be understood that the terms and phrases used in the specification herein are used for purposes of illustration and not for limitation. It will be understood that the service to which the "permutit" is put, forms no part of my invention. My invention is particularly pointed out in the appended claims.

I claim:

1. The process of regenerating "permutit" which consists in first treating the "permutit" with a solution of salt, then washing the "permutit" and thereafter completing the process of regeneration by treating the "permutit" with a solution of a hydroxid of an alkaline base.

2. The process of regenerating "permutits" which have exchanged their base with other bases which consists in first treating them with a solution of a salt, then washing the resulting substances and thereafter treating the resulting substances with a solution of a hydroxid.

3. The process of regenerating "permutits" which consists in first treating the "permutits" with an aqueous solution of a salt of an alkaline base, then thoroughly washing the resulting substance to free it from soluble chlorids, then treating with an aqueous solution of an alkaline hydroxid to complete the regeneration and then washing the regenerated "permutits" to remove the excess of hydroxid.

4. The process of regenerating "permutits" which have lost their base exchanging or adsorbing property which consists in regenerating and washing the inactive "permutits" and then treating them with a solution of a hydroxid.

5. The process of regenerating sodium "permutit" and similar substances which consists in first treating the substances with a solution of sodium chlorid, then washing to remove soluble chlorids, and thereafter completing the regeneration by treating the substance with a solution of sodium hydroxid.

6. The process of increasing the base exchanging capability of substances such as "permutit" which consists in first treating the substance with a solution of a metallic salt and thereafter treating the substance with a solution of an alkaline hydroxid.

7. The process of increasing the base exchanging capability of substances such as "permutit" which consists in first treating the substances with a solution of a salt of an alkaline base and thereafter treating the substance with a solution of an alkaline hydroxid.

8. The process of increasing the base exchanging capability of substances such as "permutit" which consists in first treating the substances with a solution of a salt and thereafter treating the substances with a solution of a hydroxid.

In testimony whereof I affix my signature in the presence of two subscribing witnesses.

WOLCOTT C. FOSTER.

Witnesses:
FELIX THOMAS,
HARRY J. MOSLYN.